Inventor
FRANK MASSA
By *Louis Bernat*  Atty.

United States Patent Office 3,392,367
Patented July 9, 1968

3,392,367
METHOD AND APPARATUS FOR OBTAINING OMNIDIRECTIONAL RADIATION FROM AN ELECTROACOUSTIC TRANSPONDER
Frank Massa, Cohasset, Mass., assignor to Massa Division, Dynamics Corporation of America, Hingham, Mass.
Filed July 21, 1966, Ser. No. 566,979
10 Claims. (Cl. 340—2)

ABSTRACT OF THE DISCLOSURE

A sonar target simulator for use under water includes a receiving and two transmitting transducers. When the receiver detects incoming sonar pulses, the two transmitting transducers send out sonar pulse signals which simulate the echoes from a target. However, to avoid interferences between the sound fields generated by the two transmitting transducers, each operates separately and in sequence. This way, there is no time when two sound fields occur simultaneously with an intensity which is sufficient to cause a significant amount of interference.

This invention is concerned with electroacoustic apparatus and more particularly to electroacoustic apparatus having means for achieving omnidirectional radiation of acoustic energy from a plurality of transducers mounted in spacial relation such that the radiation patterns thereof overlap, with the distance between the radiating faces being at least one-quarter wavelength.

One application for this invention is in connection with a target simulator for use in repeating underwater sonar signals during training exercises. A typical form of target simulator generally consists of a cylindrical body with streamlined ends that may be either towed or designed as a self-propelled vehicle. The target vehicle will generally include a receiving hydrophone that senses the arrival of a sonar signal. After the signal is amplified, it is used to cause the actuation of a transmitting transducer which sends out an acoustic signal which simulates the echo from a real target. Such target simulators sometimes fail to produce the required simulating echo signal and are unreliable in operation. It has been found that one of the difficulties associated with such target simulators is that interference patterns are generated when a pair of transducers are transmitting simultaneously from both sides of the vehicle if the separation between the transducers is greater than approximately one-quarter wavelength of the sound being radiated.

The primary purpose of this invention is to eliminate the interference problem and thereby achieve uniform radiation of sound throughout the region surrounding the vehicle.

It is a specific object of this invention to achieve effective omnidirectional radiation of acoustic signals from a pair of omnidirectional transducers mounted on opposite sides of a physical structure and separated by a distance greater than one-quarter wavelength at the frequency of operation.

Another object of this invention is to eliminate zones of interference in the radiation pattern from two spaced apart transducers which individually have approximately omnidirectional characteristics throughout a hemispherical zone.

A still further object of my invention is to design a sonar target simulator in which the retransmission of the received signal is achieved with approximately complete 360° coverage throughout the space surrounding the target.

The novel features which are characteristics of the invention are set forth with particularity in the appended claims. The invention itself, however, both as to its organization and method of operation, together with further objects and advantages thereof, will best be understood by reference to the following description taken in conjunction with the accompanying drawings in which:

Figure 1:
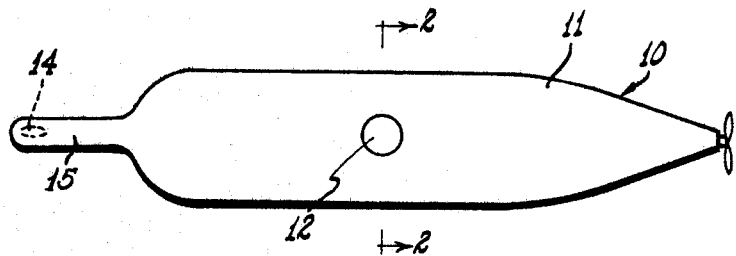
FIGURE 1 is a schematic side view of a sonar target simulator.
Figure 2:
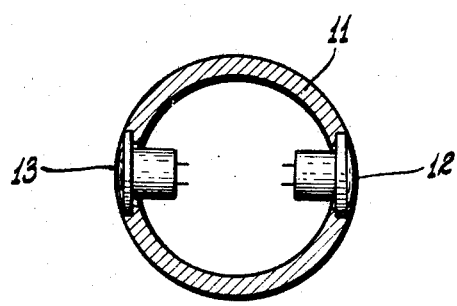
FIGURE 2 is a section taken along the line 2—2 of FIGURE 1.

Referring more particularly to FIGURE 1, reference numeral 10 generally designates a sonar target simulator constructed in accordance with the principles of this invention. The simulator 10 comprises a streamlined body 11 which can be towed or propelled underwater for use as an acoustic target simulator for repeating underwater sonar signals. An electroacoustic transducer 12 is mounted on one side of the body 11, and a second similar transducer 13 is mounted on the opposite side of the body 11, as is illustrated in FIGURE 2. A receiving transducer or hydrophone 14 is mounted near the tip of and within a nose extension 15, as illustrated in FIGURE 1. Alternately, the receiving hydrophone 14 could be trailed at the end of a cable behind the vehicle, if desired.

In the conventional operation of the target simulator, a sonar signal which impinges on the receiving hydrophone 14 at the target vehicle is used to initiate the transmission of an acoustic signal from the transducers 12 and 13. Because the wavelength of the sonar signals are typically comparable to or less than the diameter of the vehicle, there will be zones of interference from the sound being radiated by the transducers if they both radiate simultaneously.

Figure 3:
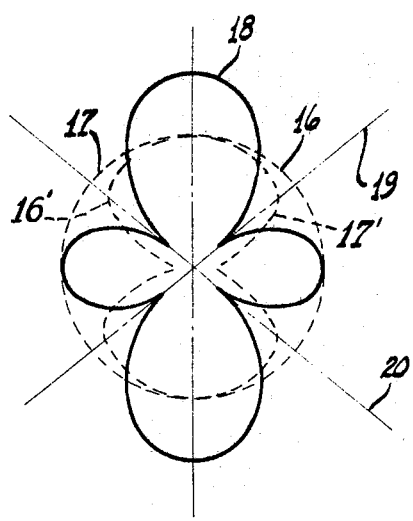
FIGURE 3 illustrates the directional radiation patterns of the transducer arrangement illustrated in FIGURE 2.

The zones of interference are illustrated in one of the simplest cases in FIGURE 3. Directional response curves 16, 16' and 17, 17' represent somewhat heart-shaped radiation patterns from the transducers 12 and 13, respectively. These patterns are rotated 180° with respect to each other because the transmitting transducers 12, 13 face outwardly from opposite sides of the body 11 and, therefore, drive in opposite directions. Although the radiation patterns 16, 16' and 17, 17' individually indicate relatively uniform radiation throughout a 180° zone, the uniformity of radiation will be destroyed when both transducers are operating simultaneously because of the phase shift that will exist between the two sound fields generated by transducers 12 and 13, except for points along a vertical plane bisecting the common axis of the two transducers. There will be regions in which the phase shift between the sound fields is one-half wavelength or odd multiples of one-half wavelength in which regions destructive interference will occur and zones of low intensity of radiation will result in which the target echo will not be heard. A simple illustration of this phenomenon is illustrated by curve 18 which represents the combined response patterns 16, 16' and 17, 17' of the transducers 12 and 13. Along the axes represented by 19 and 20, there will be zones of silence from the target simulator which means that the repeated echo will not be heard in these regions.

Figure 4:
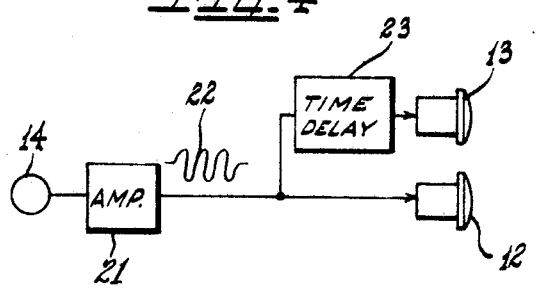
FIGURE 4 is a schematic representation of the sequential activation of each transducer to avoid simultaneous radiation from both transmitters thereby eliminating the interference or "dead" zones in the repeated signals.

In order to eliminate the zones of silence which have been found to exist in the conventional system, this invention provides that the repeated sonar signals will be transmitted sequentially, first on one transducer and then on the second transducer. A schematic arrangement for accomplishing this is illustrated in FIGURE 4 in which the signal from the receiving hydrophone 14 passes through an electrical circuit 21, preferably an amplifier which produces an electrical signal 22 of the desired magnitude which is impressed upon transducer 12 which transforms the signal to acoustic radiation which spreads uniformly throughout at 180° zone as illustrated by the directional radiation pattern 16, 16' in FIGURE 3. The same signal 22 is also passed through a time delay element 23 which may be an electronic time delay circuit or a small magnetic disc with a recording head and pick-up head spaced apart by a distance corresponding to time of duration of the pulse 22. The delayed audio signal is impressed on transducer 13 which then transmits its acoustic output uniformly in the hemispherical zone illustrated by curve 17, 17' of FIGURE 3. The electrical circuit elements which are schematically illustrated in FIGURE 4 may consist of any of several well known circuits to those skilled in the art.

This invention is not concerned with the specific electronic circuits for accomplishing the specified functions and neither does this invention claim any circuit details for achieving the described delay function. Because of the delay introduced between the signals generated by transducer 12 and transducer 13, two omnidirectional sound fields will be independently generated which completely eliminates the interference zones that would normally be caused by the simultaneous activation of both transducers. The small delay required between the two transducers will introduce only a slight range error in the returned target signal arriving from the delayed transducer. Due to the fact that in many cases the sonar pulse length may be in the order of a few milliseconds, the range error will only be a few yards which is not significantly important for usual exercise operations. Obviously the bearing accuracy of the target is not affected by the delayed sequential transmission of the sonar signal.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. In combination in electroacoustic apparatus, a plurality of transmitting transducers, means supporting said transducers in fixed spacial relation such that the radiation patterns thereof overlap, and circuit means for applying energizing electrical signals to said plurality of transducers in sequence to avoid interference between acoustic signals radiated therefrom.

2. In electroacoustic apparatus as defined in claim 1, said circuit means including means responsive to an input electrical signal for applying a first energizing electrical signal to one of said transducers, and means including a time delay circuit responsive to said input electrical signal for applying a second energizing electrical signal to another of said transducers in delayed relation to said first energizing electrical signal.

3. In electroacoustic apparatus as defined in claim 2, said energizing electrical signals being bursts of oscillatory current having a finite time duration.

4. In electroacoustic apparatus as defined in claim 3, said time delay circut being operative to introduce a time delay approximately equal to the duration of said bursts of oscillatory current.

5. In electroacoustic apparatus as defined in claim 2, a receiving transducer arranged to respond to an acoustic signal to supply said input electrical signal to said circuit means.

6. In electroacoustic apparatus as defined in claim 1, said plurality of transmitting transducers including a pair of transducers having approximately omnidirectional radiation patterns within at least a hemisphere of space and having radiating faces spaced apart at least one-fourth wavelength at the frequency of said electrical signals.

7. In electroacoustic apparatus as defined in claim 1, said supporting means including a generally cylindrical body member, and said plurality of transducers being mounted in equiangularly spaced relation on said generally cylindrical body member.

8. In electroacoustic apparatus as defined in claim 7, said plurality of transducers including a pair of transducers in diametrically opposite positions on said generally cylindrical body member.

9. In electroacoustic apparatus as defined in claim 1, said supporting means including a generally cylindrical body member adapted to be moved underwater, said plurality of transmitting transducers including a pair of transducers in diametrically opposite positions on said generally cylindrical body member each having an approximately omnidirectional radiating pattern within at least a hemisphere of space, the diameter of said body member being at least one-fourth wavelength at the frequency of said electrical signals, a receiving transducer supported from said generally cylindrical body member and arranged to respond to a received acoustic signal to apply an input electrical signal to said circuit means, said circuit means including means responsive to said input electrical signal for applying a first energizing electrical signal to one of said pair of transducers, and means including a time delay circuit responsive to said input electrical signal for applying a second energizing electrical signal to the other of said pair of transducers in delayed relation to said first energizing electrical signal.

10. In a method of achieving omnidirectional radiation from a pair of electroacoustic transducers mounted on a structure which separates their radiating faces by more than one-fourth wavelength, the steps of applying an electrical signal to one of said transducers, delaying said electrical signal to develop a delayed electrical signal, and applying the delayed electrical signal to the other of said transducers.

References Cited

UNITED STATES PATENTS

| | | | |
|---|---|---|---|
| 1,872,946 | 8/1932 | Hecht | 340—5 |
| 2,397,107 | 3/1946 | Hammond | 340—2 X |
| 3,182,284 | 5/1965 | Green | 340—9 |
| 3,295,098 | 12/1966 | Brightman et al. | 340—5 |

RICHARD A. FARLEY, *Primary Examiner.*